United States Patent [19]

Richmond et al.

[11] 3,861,849
[45] Jan. 21, 1975

[54] APPARATUS FOR PRODUCING OXIDE REFRACTORY MATERIAL HAVING FINE CRYSTAL STRUCTURE

[75] Inventors: Wesley Q. Richmond, Stevensville, Ontario, Canada; Paul Cichy, Buffalo, N.Y.

[73] Assignee: The Carborundum Company, Niagara Falls, N.Y.

[22] Filed: Sept. 18, 1972

[21] Appl. No.: 290,206

Related U.S. Application Data

[62] Division of Ser. No. 153,318, June 15, 1971.

[52] U.S. Cl. .................. 425/447, 264/8, 425/449, 425/DIG. 101
[51] Int. Cl. ............................................. B28b 1/54
[58] Field of Search .. 425/243, 449, 470, DIG. 101, 425/447; 264/5, 8, 332; 164/97, 107

[56] References Cited
UNITED STATES PATENTS

| | | | |
|---|---|---|---|
| 1,239,221 | 9/1917 | Rodman | 425/DIG. 101 |
| 1,894,208 | 1/1933 | Girsewald et al. | 264/332 |
| 1,994,718 | 3/1935 | Lellep | 425/DIG. 101 |
| 2,069,731 | 2/1937 | Trumpler | 264/5 |
| 2,297,300 | 9/1942 | Hardesty et al. | 425/DIG. 101 |
| 2,494,999 | 1/1950 | Halkins | 425/449 X |
| 2,544,678 | 3/1951 | Hancox et al. | 425/DIG. 101 |
| 2,562,149 | 7/1951 | Mollring | 425/DIG. 101 |
| 2,627,457 | 2/1953 | Kerley, Jr. | 425/DIG. 101 |
| 2,938,233 | 5/1960 | Nack et al. | 425/DIG. 101 |
| 2,939,172 | 6/1960 | Reppert | 264/8 |

*Primary Examiner*—Francis S. Husar
*Assistant Examiner*—Robert J. Craig
*Attorney, Agent, or Firm*—David E. Dougherty; Raymond W. Green

[57] ABSTRACT

Oxide refractory materials (for example, alumina-zirconia mixtures) can be cast by a semicontinuous process to have an extremely fine crystal structure, by casting a melt of the oxide refractory materials onto a non-reactive, non-melting particulate solid cooling media of a material other than that of the oxide refractory material (for example, steel spheres having a size ranging from about 5 to about 60 mm), additional cooling media being added to the solidification chamber while the oxide refractory melt is cast onto the cooling media. The melt is then cast upon the additional cooling media, until the solidification chamber is nearly filled with both oxide refractory material and cooling media. The solidified material, when crushed and graded, has exceptional utility as an extremely tough abrasive grain.

3 Claims, 1 Drawing Figure

PATENTED JAN 21 1975
3,861,849
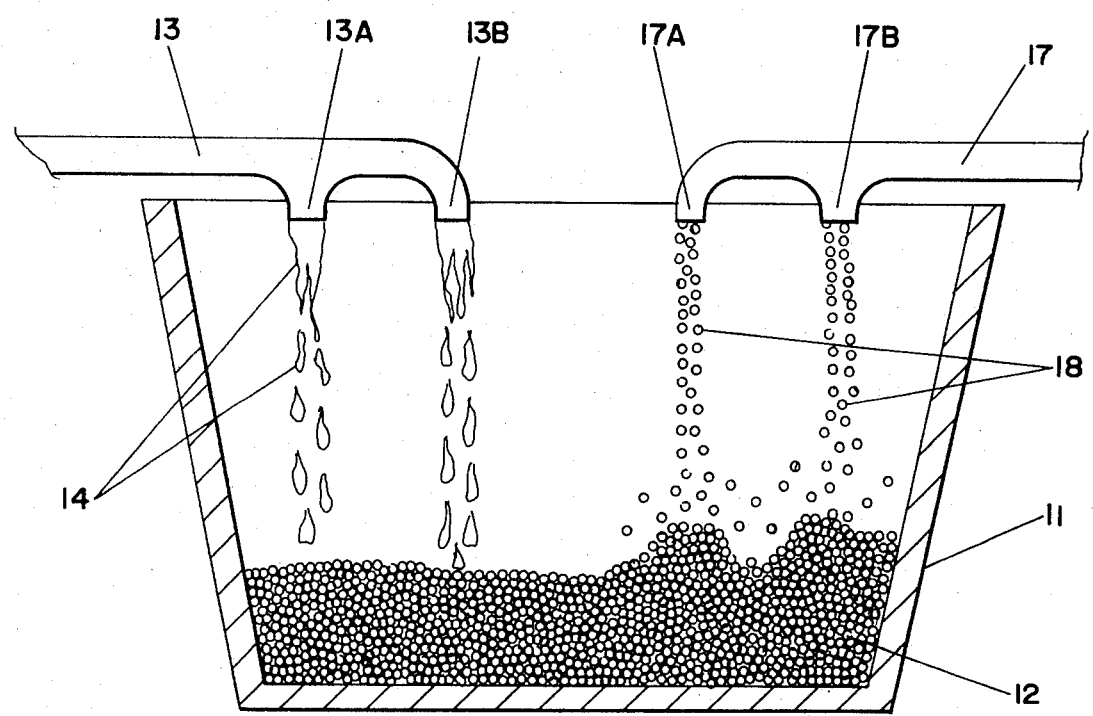

નેત્ર3,861,849

APPARATUS FOR PRODUCING OXIDE REFRACTORY MATERIAL HAVING FINE CRYSTAL STRUCTURE

CROSS REFERENCES TO RELATED APPLICATIONS

This is a division of copending application Ser. No. 153,318, filed June 15, 1971.

Copending, commonly assigned U.S. Pat. application filed by W. Q. Richmond, Ser. No. 153,302 filed on June 15, 1971, relates to the generic apparatus and process of which the present invention is an improvement, and also a composition having a fine crystal structure made possible by that apparatus and process. Copending, commonly assigned U.S. patent application filed by P. Cichy, Ser. No. 153,317, filed on June 15, 1971, now U.S. Pat. No. 3,726,621, relates to another improved process and apparatus for making oxide refractory materials having a fine crystal structure.

BACKGROUND OF THE INVENTION

This invention relates to a semicontinuous process and apparatus for producing oxide refractory material having a fine crystal structure. Oxide refractory materials having a fine crystal structure are useful as refractory grain, or more particularly, as abrasive grain for inclusion in bonded abrasives such as grinding wheels and the like. For such grinding purposes, it is highly desirable for the abrasive grain to have as fine a crystal structure as possible, since this gives toughness to the abrasive grain. Copending, commonly assigned U.S. Pat. application Ser. No. 153,302 filed June 15, 1971 by W. Q. Richmond discloses and claims a process and apparatus for making oxide refractory material, characterized by an extremely fine crystal structure (for example, at least 90 percent by numerical count of the discontinuous crystals in a two-phase system having a particle size smaller than about 40 microns). While the solidification chamber of the above-identified W. Q. Richmond application has no lateral limits in its dimensions, it does, if limited to batch operation with no cooling media added after the initial amount, have an inherent depth limitation, since the oxide refractory melt added to the solidification chamber, while initially passing through the cooling media, is rapidly cooled and becomes solidified. This solidification prevents the passage of additional liquified oxide refractory material. The apparatus and process of the above-identified W. Q. Richmond application is therefore, in its narrower sense, essentially a batch operation, since the amount of oxide refractory material which can be solidified in a single chamber is limited by the depth to which the melt flows between the cooling media before it becomes solidified and blocks further passage of melt.

It is therefore an object of this invention to provide an improved process and apparatus for cooling and solidifying oxide refractory material in a semicontinuous manner, so that the effective depth of the solidification chamber is not limited by the fact that the oxide refractory material becomes solidified upon striking the cooling media. Other objects will be apparent from the specification.

SUMMARY OF THE INVENTION

According to the present invention, an oxide refractory melt is rapidly cooled and solidified to produce a solidified melt having a fine crystal structure. A solidification chamber is first filled to a depth of at least about 15 cm with an initial supply of non-reactive, non-melting particulate solid cooling media, of a material other than that of the oxide refractory material to be rapidly cooled and solidified. The preferred cooling media are steel spheres, ranging from about 5 to about 60 mm in diameter. Additional cooling media are then added over the initial supply of cooling media while the melt of oxide refractory material is cast into the solidification chamber, over both the initial supply of cooling media and the additional cooling media, whereby the melt is rapidly cooled and solidified. The cooling media and solidified melt can than be recovered from the solidification chamber. The present invention therefore has the advantage, as compared to batch operation according to the above-identified application of W. Q. Richmond, that a substantially greater amount of oxide refractory material can be cooled and solidified within a single solidification chamber. The solidified oxide refractory material itself is substantially identical to the oxide refractory material produced according to the above-identified invention of W. Q. Richmond.

BRIEF DESCRIPTION OF THE DRAWING

The single FIGURE of the drawing represents a solidification chamber containing an initial supply of cooling media, means for adding additional cooling media and means for adding oxide refractory material which is cast upon the initial supply and additional cooling media.

DETAILED DESCRIPTION

With further reference to the drawing, there is illustrated a solidification chamber 11 having a closed bottom, the chamber being about 2 meters deep and about 2 meters in diameter. These dimensions are of course only exemplary, and the chamber can be constructed in as large a size as is desired. The initial supply of cooling media 12 is placed within the solidification chamber 11 to a depth of at least about 15 cm. The solidification chamber 11 can be constructed of any material customarily used for molds for casting oxide refractory materials, such as cast iron, steel or various ceramic refractory materials.

The criteria for the cooling media are several. First of all, the cooling media should be non-reactive with the oxide refractory material which is to be cast upon the cooling media. Secondly, the cooling media should be a non-melting particulate solid material other than the material of the oxide refractory material which is to be cast upon the cooling media. Whether the cooling media is non-melting with resepct to a particular oxide refractory material which is to be cooled and solidified upon the cooling media can be determined by reference to the thermodynamic properties of the refractory material and the cooling media, as more fully described in the above-identified application of W. Q. Richmond.

Preferred, but not essential, properties of the cooling media include the following: The refractory media should have a relatively uniform size, so that the spaces between the cooling media (and therefore the size of the oxide refractory material as solidified) are about the same size; and the cooling media should preferably pack within the solidification chamber with a relatively predictable structure. The cooling media should preferably have a smooth surface so that the solidified melt does not stick to the surface of the cooling media after solidification. In order to facilitate separation of the cooling media from the solidified oxide refractory material, it is preferred that the cooling media be magnetic, so that the cooling media can be merely removed with a magnet after solidification of the oxide refractory material. In order to be capable of repeated use, the cooling media should be tough and heat shock resistant. Accordingly, the preferred cooling media for use in the present invention compriss metallic spheres of approximately uniform size (e.g., within about 20 percent). In particular, it is preferred that carbon steel be used as the cooling media. The size of the spheres affects the rate of cooling and consequently the crystal size and friability of the solidified oxide refractory material. Accordingly, it is preferred that the steel spheres range in size from about 5 to about 60 mm. Smaller spheres cool the melt more rapidly, but steel spheres which are smaller than about 5 mm are more difficult to remove from the solidified oxide refractory material. Within this range it is preferred to utilize steel spheres having a diameter ranging from about 12 to about 40 mm; and those ranging in size from about 18 to about 32 mm are even more preferred. Other cooling media which can be used include lumps of graphite or ferrosilicon.

Referring again to the drawing, there is illustrated a solidification chamber 11 containing an initial supply of cooling media 12. The cooling media 12 fill the solidification chamber 11 to an initial depth of about 15 cm. As in the case of the above-identified invention of W. Q. Richmond, there is provided a source 13 of oxide refractory material 14. Source 13 can be provided with a plurality of inlets 13a and 13b into the solidification chamber 11. Likewise, as in the above-identified application of W. Q. Richmond, the solidification chamber 11 can be rotated, for example, at a speed ranging from about 3 to about 10 rpm. This is illustrated by arrow 16. A feature which is not disclosed in the above-identified application of W. Q. Richmond, however, is a source or means 17 for adding additional cooling media 18 to the solidification chamber 11 while oxide refractory material 14 is being added to the solidification chamber 11. Since the solidification chamber 11 can be rotated while the additional cooling media 18 and oxide refractory material 14 are being added to the solidification chamber 11, the process of filling the solidification chamber 11 with both cooling media 12, 18 and oxide refractory material 14 can be continued until the solidification chamber 11 is nearly filled. As in the case of the source 13 of oxide refractory material 14, source 17 of additional cooling media 18 can be provided with a plurality of inlets 17a and 17b into the solidification chamber 11. It is preferred to maintain the cooling media 12, 18 at a depth of at least 15 cm while the oxide refractory melt is cast thereon.

The invention will now be illustrated with an example.

EXAMPLE

A solidification chamber 11 about 2 meters in diameter and 2 meters in depth is filled to an initial depth of about 15 cm with carbon steel spheres 12 having a diameter of approximately 50 mm. A homogeneous mixture having the following composition (by weight) is melted: zirconia, 27.63 percent; titania, 1.07 percent; silica, 0.80 percent; iron oxide ($Fe_2O_3$), 0.23 percent; magnesia, 0.13 percent; sodium oxide, 0.03 percent; carbon, 0.035 percent alumina, balance; total, 100 percent. This melt is then cast upon the initial supply of steel spheres 12 while simultaneously an additional supply of steel spheres 18 is added to the solidification chamber 11. Solidification chamber 11 is rotated at a speed of about 5 rpm. The rate of adding both oxide refractory melt 14 and additional cooling media 18 is regulated such that the depth of uncovered cooling media 12, 18 at the time when the oxide refractory melt 14 is cast upon the cooling media ranges from about 15 to about 20 cm. After the solidification chamber 11 is filled to a depth of about 1.7 meters, the flow of oxide refractory material 14 and cooling media 18 into the solidification chamber 11 is discontinued. The steel sphere cooling media 12 are removed by means of an electromagnet, not shown. The solidified material is found to have shrunk approximately 25 percent by volume upon solidification, so that it has broken up into small pieces having a size approximately one to three times the size of steel spheres 12. A photomicrograph of a sample of the solidified alumina-zirconia material reveals that on a numerical count basis, less than 5 percent of the crystals of alumina, which have crystallized out of the mixture first, have a particle size (maximum dimension) of over 40 microns. Less than 50 percent of the alumina crystals have a particle size ranging from 15 to 40 microns. The balance of the alumina crystals have a particle size under 15 microns. Between the crystals of alumina described above, an alumina-zirconia eutectic containing the minor impurities has solidified in dendritic crystals surroudng the alumina crystals, such that the crystalline structure of the solidified alumina-zirconia mixture comprises a continuous crystalline phase of eutectic and discontinuous crystalline phase of alumina.

We claim:

1. Apparatus for rapidly cooling and solidifying an oxide refractory melt, comprising:
   1. a solidification chamber having a closed bottom and a depth of greater than 15 cm;
   2. an initial supply of non-reactive, non-melting particulate solid cooling media comprising carbon steel spheres ranging in diameter from about 5 to about 60 mm, which fills the solidification chamber to a depth of at least about 15 cm, the solid cooling media being of a material other than that of the oxide refractory melt to be rapidly cooled and solidified;
   3. means for casting the oxide refractory melt into the solidification chamber, over the cooling media; and
   4. means for adding additional solid cooling media comprising carbon steel spheres ranging in diameter from about 5 to about 60 mm over the cast oxide refractory, and means for casting additional oxide refractory melt over the additional solid cooling media in the solidification chamber.

2. Apparatus according to claim 1, wherein the source of oxide refractory material is provided with a plurality of inlets into the solidification chamber.

3. Apparatus according to claim 1, wherein the source of additional cooling media is provided with a plurality of inlets into the solidification chamber.

* * * * *